(12) United States Patent
Hiramatsu et al.

(10) Patent No.: US 11,619,153 B2
(45) Date of Patent: Apr. 4, 2023

(54) OIL MIST SEPARATOR

(71) Applicant: TOYOTA BOSHOKU KABUSHIKI KAISHA, Aichi-ken (JP)

(72) Inventors: Chiaki Hiramatsu, Kariya (JP); Naritsune Miyanaga, Toyota (JP); Yoji Horiuchi, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/473,258

(22) Filed: Sep. 13, 2021

(65) Prior Publication Data

US 2022/0082037 A1 Mar. 17, 2022

(30) Foreign Application Priority Data

Sep. 17, 2020 (JP) .............................. JP2020-156260

(51) Int. Cl.
*F01M 13/04* (2006.01)
*B01D 45/08* (2006.01)

(52) U.S. Cl.
CPC ............. *F01M 13/04* (2013.01); *B01D 45/08* (2013.01)

(58) Field of Classification Search
CPC ................................. F01M 13/04; B01D 45/08
See application file for complete search history.

(56) References Cited

U.S. PATENT DOCUMENTS

| 4,234,328 A * | 11/1980 | Hudson, Jr. | B01D 45/12 55/447 |
| 4,317,662 A * | 3/1982 | Hudson, Jr. | B01D 45/12 55/459.3 |
| 2005/0188937 A1* | 9/2005 | Hilpert | F01M 13/04 123/90.38 |
| 2009/0101124 A1* | 4/2009 | Mochida | F01M 13/04 123/572 |
| 2015/0052861 A1* | 2/2015 | Sugio | B01D 45/02 55/434.2 |
| 2015/0135961 A1* | 5/2015 | Sugio | F01N 3/037 96/381 |
| 2016/0265404 A1* | 9/2016 | Fujii | F01M 13/04 |
| 2020/0208553 A1* | 7/2020 | Nakaya | F01M 13/04 |

FOREIGN PATENT DOCUMENTS

JP 2007-309157 A 11/2007

* cited by examiner

*Primary Examiner* — Kurt Philip Liethen
(74) *Attorney, Agent, or Firm* — Greenblum & Bernstein P.L.C.

(57) ABSTRACT

An oil mist separator includes a case. The case includes an inlet, an outlet, a gas passage, and an oil discharge portion. The case includes a first member located in an upper portion of the case, a second member located in a lower portion of the case, and a third member partitioning the first member and the second member. The first member, the second member, and the third member are welded to each other in a stacked state. The gas passage includes an upper passage defined by the first member and the third member, a lower passage defined by the second member and the third member, and a connection passage. The connection passage connects the upper passage to the lower passage at a portion in the case corresponding to an end of the case on one side.

4 Claims, 3 Drawing Sheets

OIL MIST SEPARATOR

BACKGROUND

1. Field

The present disclosure relates to an oil mist separator configured to separate oil from blow-by gas in an internal combustion engine.

2. Description of Related Art

Japanese Laid-Open Patent Publication No. 2007-309157 discloses a typical example of such an oil mist separator. The oil mist separator includes a casing. The casing includes a gas inlet into which oil-containing blow-by gas is drawn and a gas outlet out of which the gas is discharged. The casing includes a gas passage extending from the gas inlet to the gas outlet.

The oil mist separator integrally includes a partition rib in the casing so as to ensure that the gas passage has a sufficient length. Thus, the gas passage makes a U-turn and extends in the vertical direction. Accordingly, although the above-described oil mist separator ensures that the gas passage has a sufficient length, the structure of the oil mist separator is complicated. This results in the difficulty of manufacturing the oil mist separator.

SUMMARY

It is an object of the present disclosure to provide an oil mist separator capable of being easily manufactured and ensuring that the gas passage has a sufficient length.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An oil mist separator that solves the above-described problem includes a case made of synthetic plastic. The case includes: an inlet into which blow-by gas flows; an outlet out of which the blow-by gas that has flowed from the inlet flows; a gas passage through which the blow-by gas flows from the inlet to the outlet; and an oil discharge portion, the oil mist separator is configured to separate oil from the blow-by gas in the case and discharge the separated oil out of the case through the oil discharge portion. The case includes a first member located in an upper portion of the case, a second member located in a lower portion of the case, and a third member partitioning the first member and the second member. The first member, the second member, and the third member are welded to each other in a stacked state. The gas passage includes: an upper passage defined by the first member and the third member; a lower passage defined by the second member and the third member; and a connection passage. The connection passage connects the upper passage to the lower passage at a portion in the case corresponding to an end of the case on one side.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An oil mist separator 11 according to an embodiment will now be described with reference to the drawings.

Figure 1:
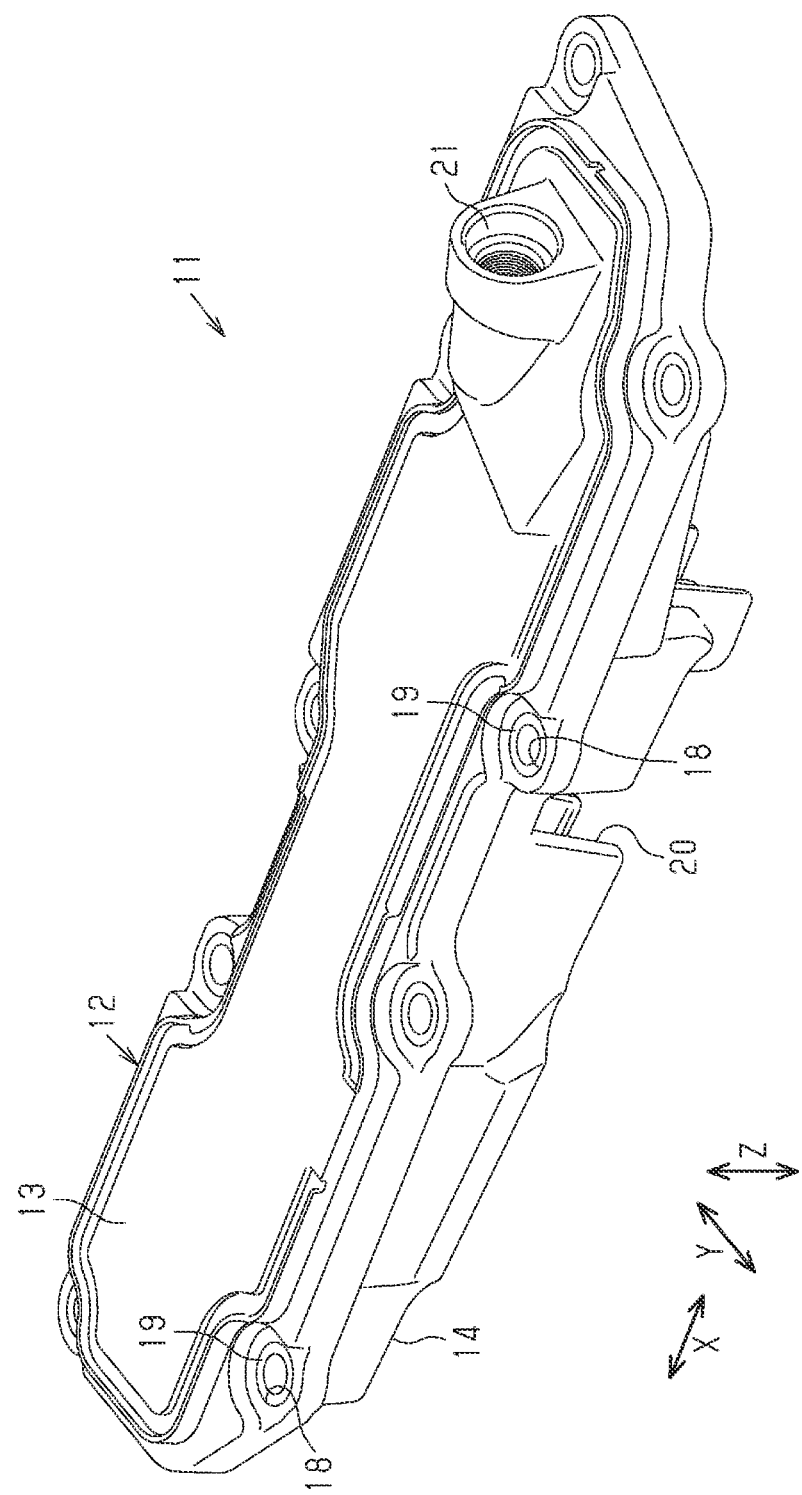
FIG. 1 is a perspective view showing an oil mist separator according to an embodiment.

Referring to FIG. 1, the oil mist separator 11 is arranged in a recirculation passage (not shown) through which the blow-by gas in a crank room (not shown) of a vehicle on-board internal combustion engine recirculates. The oil mist separator 11 is configured to separate misted oil from the blow-by gas. The oil mist separator 11 of the present embodiment has a substantially rectangular parallelepiped shape that entirely extends in the horizontal direction. The oil mist separator 11 is coupled to the upper part of a cylinder block (not shown) that is included in the vehicle on-board internal combustion engine.

In the following description, the longitudinal direction of the oil mist separator 11 is referred to as the X-direction, the vertical direction is referred to as the Z-direction, and the direction that is orthogonal to the X-direction and the Z-direction is referred to as the Y-direction.

Figure 2:
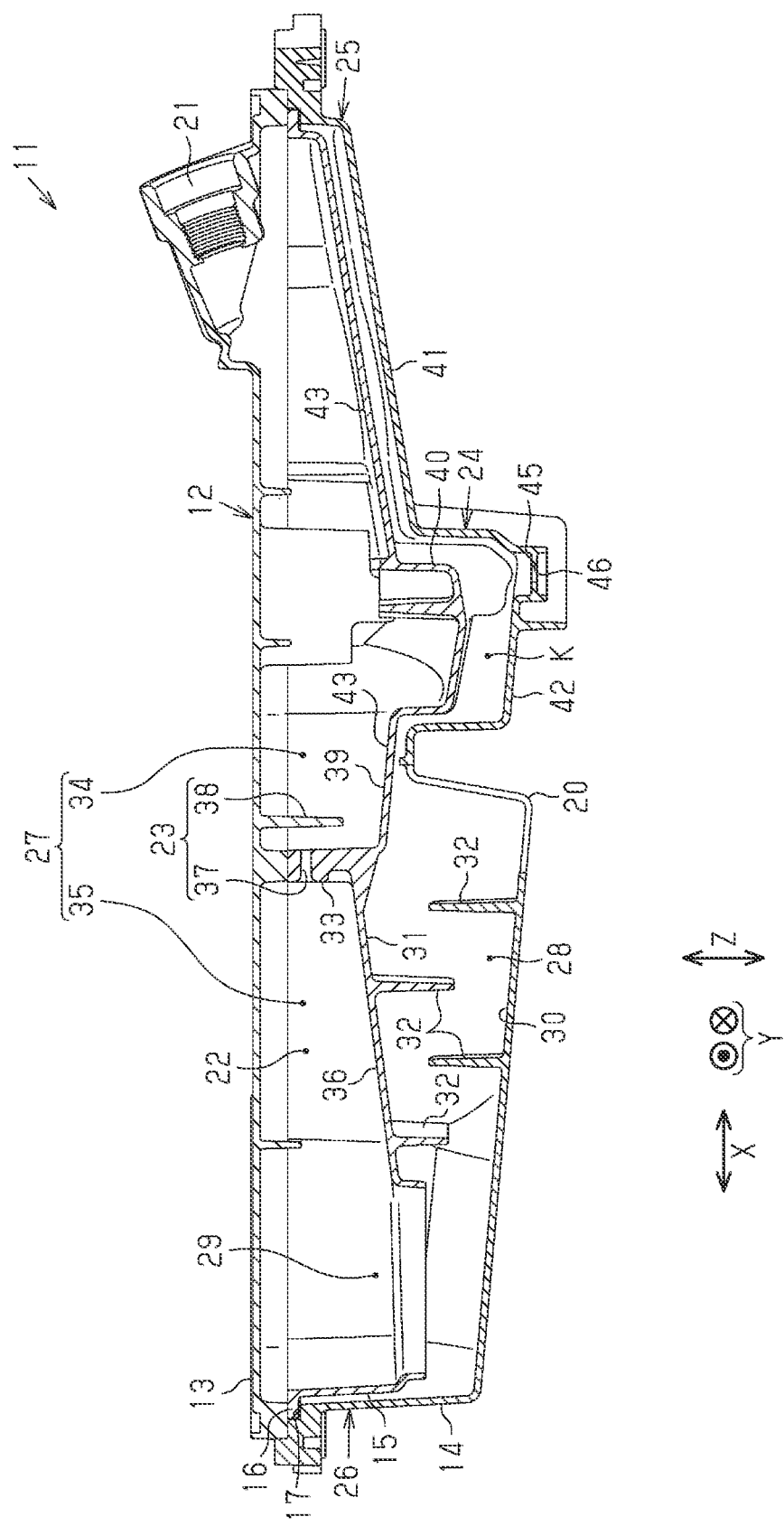
FIG. 2 is a cross-sectional view showing the oil mist separator of FIG. 1.

As shown in FIGS. 1 and 2, the oil mist separator 11 includes a case 12 that has a substantially rectangular parallelepiped shape extending in the X-direction. The case 12 is made of synthetic plastic. The case 12 includes a first member 13, a second member 14, and a third member 15. The first member 13 is located in an upper portion of the case 12 and has the form of a substantially rectangular plate. The second member 14 is located in a lower portion of the case 12 and has the form of a substantially rectangular box with a closed end. The third member 15 partitions the first member 13 and the second member 14 and has the form of a substantially rectangular box with a closed end.

The depth of the second member 14 is greater than the depth of the third member 15. The upper end of the third member 15 includes an outer edge. The entire outer edge includes a flange 16 that protrudes outward. The upper end of the second member 14 includes an inner edge. The entire inner edge includes an engagement portion 17. The engagement portion 17 protrudes inward so as to engage with the flange 16 when the third member 15 is stacked on the second member 14. The stacking of the third member 15 on the second member 14 causes the third member 15 to be completely accommodated in the second member 14 with the flange 16 engaged with the engagement portion 17.

When the first member 13 is further stacked on the second member 14, on which the third member 15 is stacked, the third member 15 is accommodated in a closed space defined by the first member 13 and the second member 14. The first member 13, the second member 14, and the third member 15 are overlapped in contact with each other at the entire edges of the first member 13, the second member 14, and the third member 15. In this state, for example, vibration welding is performed for the first member 13, the second member 14, and the third member 15 at the entire edges so as to form the case 12.

The case 12 includes circular holes 18 that extend through the edge of the case 12 on the outer side of the welded portion of the first member 13, the second member 14, and the third member 15. The bolt holes 18 are spaced apart from each other in the peripheral direction. The case 12 is fixed to the cylinder block (not shown) by inserting bolts (not shown) into the bolt holes 18. Each bolt hole 18 includes a tubular protection member 19 made of metal.

As shown in FIG. 2, the case 12 includes an inlet 20, an outlet 21, a gas passage 22, an oil trapping portion 23, and an oil discharge portion 24. Blow-by gas flows into the inlet 20. The blow-by gas that has flowed into the inlet 20 flows out of the outlet 21. The blow-by gas flows from the inlet 20 to the outlet 21 in the gas passage 22. The oil trapping portion 23 separates the misted oil from the blow-by gas in the case 12 and traps the oil. The oil discharge portion 24 discharges the oil trapped in the oil trapping portion 23 out of the case 12.

The inlet 20 is located at the lower part of the case 12. The case 12 includes a first-side end 25 and a second-side end 26. The first-side end 25 is an end on one side of the case 12 in the X-direction. The second-side end 26 is an end on the other side of the case 12 in the X-direction. The outlet 21 is located at the first-side end 25 in the upper part of the case 12. The inlet 20 opens downward and toward the first-side end 25.

The gas passage 22 in the case 12 includes an upper passage 27, a lower passage 28, and a connection passage 29. The upper passage 27 is formed by the first member 13 and the third member 15. The lower passage 28 is formed by the second member 14 and the third member 15. The connection passage 29 connects the upper passage 27 to the lower passage 28 at a portion in the case 12 corresponding to the second-side end 26. The lower passage 28 extends from the inlet 20 to the connection passage 29 in the lower part of the case 12. The upper passage 27 extends from the connection passage 29 to the outlet 21 in the upper part of the case 12.

The connection passage 29 extends in the Z-direction at the portion in the case 12 corresponding to the second-side end 26. The connection passage 29 connects the upper passage 27 to the lower passage 28 at the portion in the case 12 corresponding to the second-side end 26. That is, the connection passage 29 connects the upper passage 27 to the lower passage 28 at a portion in the case 12 corresponding to the end of the case 12 on one side. Thus, the gas passage 22 extends in the case 12 substantially straight from the inlet 20 to the second-side end 26, folds back so as to upwardly make a U-turn at the second-side end 26, and then extends substantially straight to the outlet 21. That is, the gas passage 22 makes a U-turn and extends in the Z-direction to form two sections (i.e., upper and lower sections) in the case 12, thereby ensuring that the gas passage 22 has a sufficient length.

The second member 14 includes an inner bottom surface 30 that defines the lower passage 28. The third member 15 includes a lower surface 31 that defines the lower passage 28. The inner bottom surface 30 of the second member 14 and the lower surface 31 of the third member 15 each include, for example, two protruding plates 32. Each protruding plate 32 protrudes in the Z-direction such that the blow-by gas flowing through the lower passage 28 from the inlet 20 toward the connection passage 29 flows up and down in a wavy manner. The protruding plates 32 of the inner bottom surface 30 of the second member 14 and the protruding plates 32 of the lower surface 31 of the third member 15 are alternately spaced apart from each other along the lower passage 28. Gaps are created between the inner surface of the second member 14 in the Y-direction and the protruding plates 32 of the inner bottom surface 30 of the second member 14. The inner bottom surface 30 of the second member 14 is inclined so as to gradually become lower toward the inlet 20.

Figure 3:
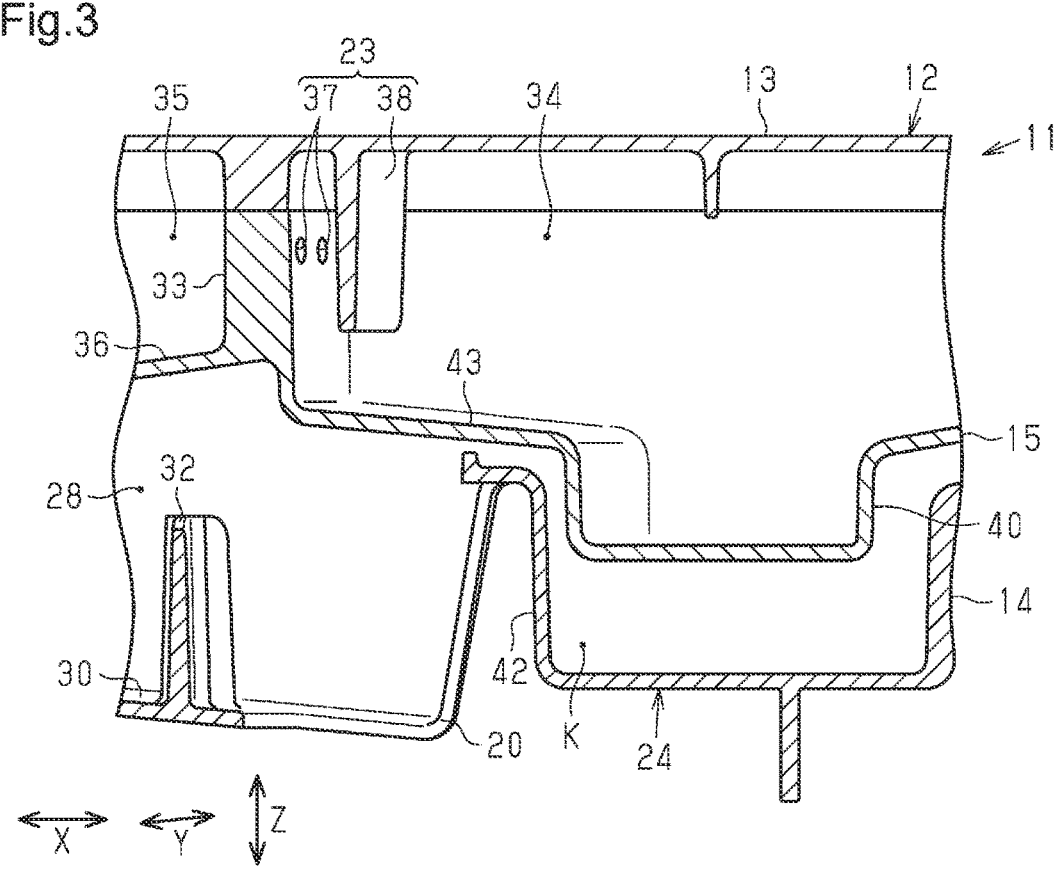
FIG. 3 is a cross-sectional view showing the oil trapping portion and the oil discharge portion of the oil mist separator.

As shown in FIGS. 2 and 3, the upper passage 27 includes a partition wall 33 at a position corresponding to the inlet 20 in the Z-direction. The partition wall 33 partitions the upper passage 27 into an upstream portion (a portion closer to the second-side end 26) and a downstream portion (a portion closer to the first-side end 25). The passage downstream of the partition wall 33 in the upper passage 27 is an upper downstream passage 34. The passage upstream of the partition wall 33 in the upper passage 27 is an upper upstream passage 35.

The third member 15 includes an inner bottom surface 36 that defines the upper upstream passage 35. The inner bottom surface 36 is inclined so as to gradually become lower toward the second-side end 26. Insertion holes 37 extend through the upper part of the partition wall 33. A collision plate 38 is arranged at a portion of the upper downstream passage 34 located on the axis of the insertion holes 37. The collision plate 38 extends downward from the lower surface of the first member 13.

More specifically, the collision plate 38 is arranged at a position proximate to the downstream side of each insertion hole 37 and at a position opposing the insertion holes 37 in the X-direction. In the present embodiment, the insertion holes 37 and the collision plate 38 form the oil trapping portion 23. The oil trapping portion 23 separates the misted oil from the blow-by gas flowing through the upper passage 27 from the second-side end 26 toward the first-side end 25 and traps the oil.

Figure 4:
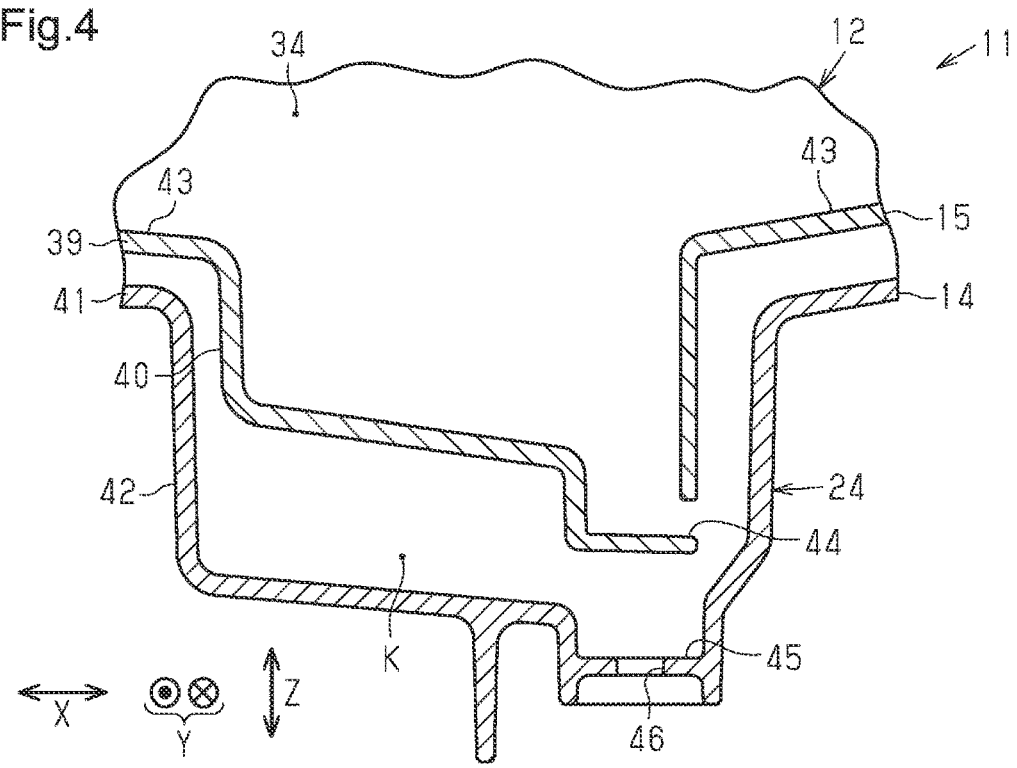
FIG. 4 is an enlarged cross-sectional view mainly showing the oil discharge portion of the oil mist separator.

As shown in FIGS. 2 and 4, the oil discharge portion 24 is located downstream of the oil trapping portion 23 at the lower part of the upper downstream passage 34. The oil discharge portion 24 discharges the oil trapped in the oil trapping portion 23 out of the case 12. The oil discharge portion 24 includes a first discharge part 40 and a second discharge part 42. The third member 15 includes a bottom wall 39 that defines the upper downstream passage 34. The bottom wall 39 includes a portion that protrudes downward so as to have a box shape with a closed end. The first discharge part 40 is defined by the portion of the bottom wall 39 that protrudes downward so as to have a box shape with a closed end. The second member 14 includes a bottom wall 41 corresponding to the first discharge part 40. The bottom wall 41 includes a portion that protrudes downward so as to have a box shape with a closed end. The second discharge part 42 is defined by the portion of the bottom wall 41 that protrudes downward so as to have a box shape with a closed end. The third member 15 includes an inner bottom surface 43. The inner bottom surface 43 is inclined so as to define the upper downstream passage 34 and gradually become lower toward the first discharge part 40.

The first discharge part 40 includes a first discharge port 44 out of which the oil separated in the upper downstream passage 34 is discharged to the second discharge part 42. That is, the first discharge port 44 extends through the bottom of the first discharge part 40 and opens toward the first-side end 25 in the case 12. The second discharge part 42 externally covers the first discharge part 40. The second discharge part 42 includes a reservoir 45 and a second discharge port 46. The reservoir 45 temporarily stores the oil discharged from the first discharge port 44. The oil in the reservoir 45 is discharged from the second discharge port 46 to the outside of the case 12.

More specifically, the second discharge port 46 opens downward and extends through the middle portion of the bottom wall of the reservoir 45, which protrudes downward from the bottom of the second discharge part 42 and has a tubular shape with a closed end. The second discharge port 46 has a smaller cross-sectional flow area than the reservoir 45. The first discharge part 40 and the second discharge part 42 define a space K. The space K connects to the inlet 20.

The operation of the oil mist separator 11 will now be described.

Referring to FIGS. 2 and 4, when the vehicle on-board internal combustion engine (not shown) is started, negative pressure is generated in the intake passage (not shown). The generation of the negative pressure causes air in the case 12 of the oil mist separator 11 to be sucked from the outlet 21 so that the case 12 has a negative pressure. This causes the blow-by gas containing oil in the crank room (not shown) to flow from the inlet 20 into the lower passage 28.

The case 12 is located such that the inlet 20 opens on the side opposite from a side on which the oil in the crank room (not shown) is dispersed in the X-direction. This prevents the oil dispersed in the crank room (not shown) from directly entering the lower passage 28 in the case 12 from the inlet 20.

After flowing into the lower passage 28 from the inlet 20, the blow-by gas flows up and down in a wavy manner toward the connection passage 29 while colliding with each protruding plate 32. The collision of the blow-by gas on each protruding plate 32 causes some of the misted oil (oil mist) in the blow-by gas to collect on the protruding plate 32.

After a certain amount of the oil collects on each protruding plate 32, gravity causes the oil to flow down on the inner bottom surface 30 of the second member 14. The gravity causes the oil that has flowed down on the inner bottom surface 30 of the second member 14 to flow toward the inlet 20 on the inner bottom surface 30. Then, the oil is discharged from the inlet 20 into the crank room (not shown), which is located outside of the case 12.

After flowing to the connection passage 29, the blow-by gas flows to the upper upstream passage 35 so as to make a U-turn through the connection passage 29. After flowing to the upper upstream passage 35, the blow-by gas flows toward the insertion holes 37. Gravity causes some of the oil in the blow-by gas to drop on the inner bottom surface 36 of the third member 15, which defines the upper upstream passage 35.

Gravity causes the oil that has dropped on the inner bottom surface 36 of the third member 15 to flow toward the connection passage 29 on the inner bottom surface 36 and then drops on the inner bottom surface 30 of the second member 14. The gravity causes the oil that has dropped on the inner bottom surface 30 of the second member 14 to flow toward the inlet 20 on the inner bottom surface 30. Then, the oil is discharged from the inlet 20 into the crank room (not shown), which is located outside of the case 12.

After flowing to the upper upstream passage 35, the blow-by gas flows through the insertion holes 37 to the upper downstream passage 34 and collides with the collision plate 38. Since the insertion holes 37 have a smaller cross-sectional flow area than the upper upstream passage 35, the speed of the blow-by gas through the insertion holes 37 increases. Thus, the blow-by gas flowing from the insertion holes 37 to the upper downstream passage 34 collides with the collision plate 38 with momentum.

The collision causes the oil in the blow-by gas to collect on the collision plate 38 so that the oil is separated from the blow-by gas and the oil is trapped. Gravity causes the oil on the collision plate 38 to drop on the inner bottom surface 43 of the third member 15, which defines the upper downstream passage 34, and then flow along the inner bottom surface 43 into the first discharge part 40.

The blow-by gas, which has collided with the collision plate 38 and from which the oil has been separated, curves around the collision plate 38 and flows through the upper downstream passage 34 toward the outlet 21. The oil that has dropped on the inner bottom surface 43 of the third member 15 from the blow-by gas at a position of the upper downstream passage 34 closer to the outlet 21 than the first discharge part 40 flows along the inner bottom surface 43 into the first discharge part 40. The blow-by gas, from which the oil has been separated and which thus contains virtually no amount of the oil, flows from the outlet 21 to the outside of the case 12 and flows into the intake passage (not shown).

After flowing into the first discharge part 40, the oil flows from the first discharge port 44 into the space K between the first discharge part 40 and the second discharge part 42 in the second discharge part 42 so that the reservoir 45 stores the oil. In this case, the oil is kept in the reservoir 45 by the balance of, for example, the weight, viscosity, and surface tension of the oil in the reservoir 45. When the oil is stored in the reservoir 45 in a predetermined amount or larger, the weight of the oil in the reservoir 45 increases. Thus, the forces are not well-balanced. As a result, the oil in the reservoir 45 is discharged from the second discharge port 46 to the inside of the crank room (not shown), which is located outside of the case 12.

Since the space K of the second discharge part 42 connects to the inlet 20, the pressure in the space K is almost equal to the pressure outside of the case 12. Accordingly, even when the negative pressure in the upper downstream passage 34 increases, the oil in the reservoir 45 is prevented from blowing up and flowing backward from the first discharge port 44 toward the upper downstream passage 34.

The embodiment described above in detail has the following advantages.

(1) The oil mist separator 11 includes the case 12, which is made of synthetic plastic. The case 12 includes the inlet 20, into which blow-by gas flows, the outlet 21, out of which the blow-by gas that has flowed from the inlet 20 flows, the gas passage 22, through which the blow-by gas flows from the inlet 20 to the outlet 21, and the oil discharge portion 24. The oil mist separator 11 is configured to separate the oil from the blow-by gas in the case 12 and discharge the separated oil through the oil discharge portion 24 out of the case 12. The case 12 includes the first member 13, which is located in the upper portion of the case 12, the second member 14, which is located in the lower portion of the case 12, and the third member 15, which partitions the first member 13 and the second member 14. The first member 13, the second member 14, and the third member 15 are welded to each other in a stacked state. The gas passage 22 includes the upper passage 27, which is defined by the first member 13 and the third member 15, the lower passage 28, which is defined by the second member 14 and the third member 15, and the connection passage 29. The connection passage 29 connects the upper passage 27 to the lower passage 28 at a portion in the case 12 corresponding to the end of the case 12 on one side. In this structure, only by welding the first member 13, the second member 14, and the third member 15 to each other in the stacked state, the case 12 is manufactured with the gas passage 22 that internally makes a U-turn and extends in the Z-direction (vertical direction). This allows the oil mist separator 11 to be easily manufactured and ensures that the gas passage 22 has a sufficient length.

(2) In the oil mist separator 11, the oil discharge portion 24 includes the first discharge part 40 and the second discharge part 42. The first discharge part 40 includes the first discharge port 44, out of which the oil separated in the case 12 is discharged. The second discharge part 42 externally covers the first discharge part 40 and includes the second discharge port 46. The oil discharged from the first discharge port 44 is temporarily stored in the second discharge port 46 and then discharged out of the second discharge port 46. In this structure, the entry of the oil from the oil discharge portion 24 into the case 12 due to the negative pressure generated in the case 12 is prevented.

(3) The case 12 of the oil mist separator 11 includes the oil trapping portion 23. The oil trapping portion 23 is located in the gas passage 22 and configured to separate oil from blow-by gas and trap the oil. The oil discharge portion 24 is located downstream of the oil trapping portion 23 in the gas passage 22. In this structure, the oil separated and trapped by the oil trapping portion 23 is guided along the flow of the blow-by gas and quickly discharged from the oil discharge portion 24 to the outside of the case 12.

(4) In the oil mist separator 11, the first member 13, the second member 14, and the third member 15 are welded in a state of being overlapped in contact with each other at the entire edges of the first member 13, the second member 14, and the third member 15. This structure provides sufficient sealing of the entire edges of the first member 13, the second member 14, and the third member 15.

Modifications

The above-described embodiment may be modified as follows. The above-described embodiment and the following modifications can be combined as long as the combined modifications remain technically consistent with each other.

The first member 13, the second member 14, and the third member 15 do not necessarily have to be welded in a state of being overlapped in contact with each other at the entire edges of the first member 13, the second member 14, and the third member 15. That is, for example, the entire edges of the first member 13, the second member 14, and the third member 15 may be made of a material that provides close contact through two-color molding, so that the first member 13, the second member 14, and the third member 15 are joined to each other in close contact with each other through snap-fitting at their entire edges.

The oil discharge portion 24 does not necessarily have to be located downstream of the oil trapping portion 23 in the gas passage 22.

The oil discharge portion 24 does not necessarily have to include the second discharge part 42.

The collision plate 38 may be replaced with, for example, a filter made of nonwoven fabric. In this case, the filter and the insertion holes 37 form the oil trapping portion. Further, in this case, the oil trapping portion does not have to be formed by the filter and the insertion holes 37 and may have a typical cyclone-type structure.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An oil mist separator, comprising:
   a case made of synthetic plastic, wherein the case includes:
   an inlet into which blow-by gas flows;
   an outlet out of which the blow-by gas that has flowed from the inlet flows;
   a gas passage through which the blow-by gas flows from the inlet to the outlet;
   an oil discharge portion; and
   an oil trap portion,
   the oil mist separator is configured to separate oil from the blow-by gas in the case and discharge the separated oil out of the case through the oil discharge portion,
   the case includes a first structure located in an upper portion of the case, a second structure located in a lower portion of the case, and a third structure partitioning the first structure and the second structure,
   the first structure, the second structure, and the third structure are welded to each other in a stacked condition,
   the gas passage includes:
   an upper passage defined by the first structure and the third structure;
   a lower passage defined by the second structure and the third structure; and
   a connection passage,
   the lower passage includes a plurality of protruding plates that project into the lower passage, a first protruding plate of the protruding plates projects from an upper side of the second structure to a free end of the first protruding plate, a second protruding plate of the protruding plates projects from a lower side of the third structure to a free end of the second protruding plate, and the protruding plates are disposed so that the blow-by gas flows in an up and down wave flow through the lower passage and collides with the protruding plates to collect the oil from the blow-by gas on the protruding plates,
   the connection passage connects the upper passage to the lower passage at a portion in the case corresponding to an end of the case on one side, and
   the oil trap portion is located in one of the upper passage and the lower passage that is arranged between the outlet and the connection passage in a flowing direction of the blow-by gas, the oil trap portion being configured to separate the oil from the blow-by gas and trap the oil.

2. The oil mist separator according to claim 1, wherein the oil discharge portion includes:
   a first discharge part including a first discharge port out of which the oil separated in the case is discharged; and
   a second discharge part that externally covers the first discharge part and includes a second discharge port, wherein the oil discharged from the first discharge port is temporarily stored in the second discharge port and then discharged out of the second discharge port.

3. The oil mist separator according to claim 1, wherein the oil discharge portion is located downstream of the oil trap portion in the gas passage.

4. The oil mist separator according to claim 1, wherein the first structure, the second structure, and the third structure are welded in a condition of being overlapped in contact with each other at entire edges of the first structure, the second structure, and the third structure.

\* \* \* \* \*